UNITED STATES PATENT OFFICE.

HENRY V. WALKER, OF NEW YORK, N. Y.

PROCESS OF PRODUCING INSECTICIDAL GAS.

No. 905,609.

Specification of Letters Patent.

Patented Dec. 1, 1908.

Application filed October 9, 1906. Serial No. 338,092.

*To all whom it may concern:*

Be it known that I, HENRY V. WALKER, a citizen of the United States, residing at Brooklyn, in the city of New York, in the county of New York and State of New York, have invented certain new and useful Improvements in Processes of Producing Insecticidal Gas, of which the following is a specification.

My invention relates to the production of gas for insecticidal and similar purposes and its novelty consists in the several successive steps of the process employed.

The principal purpose of the invention is by a simple and practical method to produce a gas which will effectively destroy insects, such as mosquitoes and flies which serve as vehicles for the transmission of disease. In pursuance of this object a gas is evolved from a suitable monohydroxyl derivative of an aromatic hydrocarbon, possessing insecticidal properties when in a state of vapor, by mixing therewith a material, such as quicklime, which chemically combines with a second material, such as water, with the evolution of heat sufficient to volatilize said monohydroxyl derivative. The monohydroxyl derivatives preferred are phenol and naphthol, which themselves are capable of combining with the quicklime. In such cases I mix with the lime and phenol or naphthol, a protecting reagent which has a greater affinity for the lime when in solution than the phenol and naphthol. A good example of such an agent is sulfate of alumina. While the mixture is waiting to be used, the lime and sulfate of alumina re-act slightly, if at all, but at the same time the lime is prevented from reacting with the phenol or naphthol. When, however, water is added, the heat of the combination volatilizes the phenol or naphthol and produces the desired insecticidal gas.

In carrying out the preferred method a suitable quantity of the selected monohydroxyl derivative of an aromatic hydrocarbon is mixed with suitable quantities of the selected protecting reagent and substance which when combined with a second material develops heat for the volatilization of the said derivative. This mixture, without the "second material", referred to, is inclosed in a suitable container until it is to be used. When this time arrives, I add to the mixture a sufficient quantity of the "second material" which will react upon the lime and develop sufficient heat to cause the evolution of an insecticidal gas.

When the selected materials are phenol or naphthol, quicklime and sulfate of alumina they may be mixed in the following quantities: phenol or naphthol, four ounces; sulfate of alumina two ounces; and lime one and one-half pounds. To this, at the time of use, may be added, say ten ounces of water. The gas thus evolved is destructive of all mosquitoes, flies and other insects within the range of its influence and will be found fully effective in killing all insects in an ordinary sized room, say one containing about 1,500 cubic feet.

It will readily be understood by those skilled in the art that my process is applicable through a somewhat wide range of equivalents, intended to be included within the scopes of the subjoined claims. Any otherwise suitable reagent capable of combining with a second reagent to produce the necessary degree of heat may be employed in place of the lime and water. There are likewise a number of substances which will behave like the phenol and naphthol with more or less similar results and efficiency. Protecting reagents other than the suggested sulfate of alumina may, by analogy, be identified and employed by the skilled chemist. I have, however, described the preferred form of my invention and the one which I now believe is best in carrying it out, but without intending thereby to restrict myself thereto.

Having thus described my invention what I claim as new, is:—

1. The process of producing an insecticidal gas which consists in mixing with a suitable monohydroxyl derivative of an aromatic hydrocarbon, a protecting material and a reagent capable of developing heat sufficient to volatilize said derivative when combined with a second reagent and adding sufficient quantity of the second reagent to effect the desired combination.

2. The process of producing an insecticidal gas which consists in mixing a suitable monohydroxyl derivative of an aromatic hydrocarbon, possessing insecticidal properties when in a state of vapor, with quicklime and a suitable reagent having when in solution a greater affinity for the lime than the first named material, and adding a sufficient quantity of water to combine chemically with the lime.

3. The process of producing an insecticidal gas which consists in mixing a suitable monohydroxyl derivative of an aromatic hydrocarbon containing more than five carbon atoms and possessing insecticidal properties when in a state of vapor, with a reagent capable of combining with a second reagent to produce an evolution of heat sufficient to volatilize said derivative, and with a protective reagent having a greater affinity for the first named reagent than said derivative, and adding said second reagent.

4. The process of producing an insecticidal gas which consists in mixing a suitable monohydroxyl derivative of an aromatic hydrocarbon containing more than five carbon atoms and possessing insecticidal properties when in a state of vapor, with quicklime and a reagent having a greater affinity for the lime than said derivative, and adding sufficient water to combine with the lime.

5. The process of producing an insecticidal gas which consists in mixing a suitable monohydroxyl derivative of an aromatic hydrocarbon containing from six to ten carbon atoms, inclusive, and possessing insecticidal properties when in a state of vapor, with quicklime and a reagent having a greater affinity than the said derivative for the lime, and adding sufficient water to combine with the lime.

6. The process of producing an insecticidal gas which consists in mixing a suitable monohydroxyl derivative of an aromatic hydrocarbon containing from six to ten carbon atoms, inclusive, and possessing insecticidal properties when in a state of vapor, with a material which when united with a suitable reagent is capable of volatilizing said derivative, and with a protective reagent having a greater affinity for said material than said derivative, and adding the first named reagent.

7. The process of producing an insecticidal gas which consists in mixing a suitable monohydroxyl derivative of an aromatic hydrocarbon possessing insecticidal properties when in a state of vapor, with quicklime, a protecting reagent and water.

8. The process of producing an insecticidal gas which consists in mixing a suitable monohydroxyl derivative of an aromatic hydrocarbon, possessing insecticidal properties when in a state of vapor, with quicklime sulfate of alumina and water.

9. The process of producing an insecticidal gas which consists in mixing with naphthol, a suitable protecting reagent, quicklime and a material capable of combining with the quicklime with the evolution of heat sufficient to volatilize the naphthol.

10. The process of producing an insecticidal gas which consists in mixing with naphthol, sulfate of alumina, quicklime and water.

In testimony whereof I affix my signature in presence of two witnesses.

HENRY V. WALKER.

Witnesses:
HERMAN MEYER,
ALAN McDONNELL.